United States Patent
Tanaka et al.

(10) Patent No.: US 7,994,698 B2
(45) Date of Patent: Aug. 9, 2011

(54) ELECTRON EMITTING DEVICE, DISPLAY APPARATUS USING ELECTRON EMITTING DEVICE, AND METHOD OF MANUFACTURING ELECTRON EMITTING DEVICE

(75) Inventors: Ryota Tanaka, Saitama (JP); Nobuyasu Negishi, Saitama (JP); Kazuto Sakemura, Saitama (JP); Yoshiyuki Okuda, Saitama (JP); Tomonari Nakada, Saitama (JP); Atsushi Watanabe, Saitama (JP); Takamasa Yoshikawa, Saitama (JP); Kiyohide Ogasawara, Saitama (JP)

(73) Assignee: Pioneer Corporation, Tokyo (JP)

( * ) Notice: Subject to any disclaimer, the term of this patent is extended or adjusted under 35 U.S.C. 154(b) by 129 days.

(21) Appl. No.: 12/225,798

(22) PCT Filed: Mar. 26, 2007

(86) PCT No.: PCT/JP2007/056214
§ 371 (c)(1),
(2), (4) Date: Feb. 27, 2009

(87) PCT Pub. No.: WO2007/114103
PCT Pub. Date: Oct. 11, 2007

(65) Prior Publication Data
US 2009/0284129 A1    Nov. 19, 2009

(30) Foreign Application Priority Data
Mar. 31, 2006   (JP) .................................. 2006-096990

(51) Int. Cl.
*H01J 63/04* (2006.01)

(52) U.S. Cl. .......................................... 313/495; 445/49
(58) Field of Classification Search .......... 313/495–497; 445/49–51
See application file for complete search history.

(56) References Cited

U.S. PATENT DOCUMENTS
6,388,376 B1 * 5/2002 Negishi et al. ................ 313/496
2004/0251841 A1   12/2004 Negishi et al.

FOREIGN PATENT DOCUMENTS
| CN | 1599941 | 3/2005 |
| JP | 2005-512280 | 4/2005 |
| WO | 03/049132 | 6/2003 |

OTHER PUBLICATIONS

International Preliminary Examination Report on Patentability issued Oct. 30, 2008.
International Search Report issued May 22, 2007 in the International (PCT) Application of which the present application is the U.S. National Stage.

* cited by examiner

*Primary Examiner* — Toan Ton
*Assistant Examiner* — Hana S Featherly
(74) *Attorney, Agent, or Firm* — Wenderoth, Lind & Ponack, L.L.P.

(57) ABSTRACT

An electron emitting device includes an amorphous electron supply layer, an insulating layer formed on the electron supply layer, and an electrode formed on the insulating layer. The electron emits device emitting electrons when an electric field is applied between the electron supply layer and the electrode. The electron emitting device includes a concave portion provided by notching the electrode and the insulating layer to expose the electron supply layer, and a carbon layer covering the electrode and the concave portion except for an inner portion of an exposed surface 4a of the electron supply layer and being in contact with an edge portion of the exposed surface of the electron supply layer.

13 Claims, 7 Drawing Sheets

(a)

(b)

ELECTRON EMITTING DEVICE, DISPLAY APPARATUS USING ELECTRON EMITTING DEVICE, AND METHOD OF MANUFACTURING ELECTRON EMITTING DEVICE

BACKGROUND OF THE INVENTION

I. Technical Field

The present invention relates to an electron emitting device, a display apparatus using the electron emitting device, and a method of manufacturing the electron emitting device.

II. Description of the Related Art

Display apparatuses, such as a flat panel display, using an electron emitting device realize bright image display with high contrast by emitting electrons from an electron emitting source into a vacuum and smashing the electrons against a fluorescent material to cause light emission.

In a conventional Spindt-type electron emitting device, a conical electron gun and a gate electrode having an opening at the position of the tip of the electron gun are formed over a substrate and electrons are emitted from the tip of the electron gun toward a collector electrode. Since the electron gun has a three-dimensional structure, the manufacturing process thereof is complicated, and thus the device is difficult to miniaturize.

On the other hand, in an electron emitting device of a surface emitting type, a semiconductor layer, an insulating layer, and an upper electrode are stacked over a lower electrode and a voltage is applied between the electrodes to emit electrons from the surface of the upper electrode. Although a device of the surface emitting type is easily formed in a miniature structure due to the stacked structure, thinning the insulating layer for providing high power at a low voltage may produce a defect, such as a pinhole.

To address this, Published Japanese Translation No. 2005-512280 of PCT International Publication has described a device of an MIS (Metal Insulator Semiconductor) structure formed of metal, insulator, and semiconductor in which a semiconductor layer is made of an amorphous material and an island region is provided where an insulating layer is gradually thinned. A carbon layer is formed over, under, or inside the island region, and a crystal region is provided in an electron supply layer at or near a region in which the island region has the smallest thickness. With the structure, the island region serves as an emission site and the amount of electrons emitted from the island region is increased. Since the amount of emitted electrons can be maintained even when the insulating layer has a certain thickness except the island region, it is possible to prevent a defect such as a pinhole in the insulating layer.

SUMMARY OF THE INVENTION

When the carbon layer is in contact with the electron supply layer over a large region of the emission site, a leak current which does not contribute to electron emission may be increased during energization to reduce the efficiency. In addition, since the carbon layer produces heat during energization, a large amount of heat may be lost. Furthermore, the heat production in the carbon layer may crystallize a large region of the electron supply layer and the crystallization may change the volume to damage or break the device. Since the structure described in Published Japanese Translation No. 2005-512280 of PCT International Publication includes the carbon layer provided for the entire island region, it is difficult to adjust the area of contact of the carbon layer with the electron supply layer.

Problems to be solved by the present invention include the abovementioned ones, for example. It is thus an object of the present invention to provide an electron emitting device in which electron emission cam be realized with improved efficiency and damage to the device can be prevented, a display apparatus using such an electron emitting device, and a method of manufacturing such an electron emitting device.

The present invention provides an electron emitting device including an amorphous electron supply layer, an insulating layer formed on the electron supply layer, and an electrode formed on the insulating layer, the electron emitting device emitting electrons when an electric field is applied between the electron supply layer and the electrode, wherein the electron emitting device includes a concave portion provided by notching the electrode and the insulating layer to expose the electron supply layer, and a carbon layer covering the electrode and the concave portion except for an inner portion of an exposed surface of the electron supply layer and being in contact with an edge portion of the exposed surface of the electron supply layer.

In another aspect, the present invention provides a display apparatus including an electron emitting device and a light emitter which emits light when electrons emitted from the electron emitting device are smashed against the light emitter, wherein the electron emitting device is the abovementioned electron emitting device.

In another aspect, the present invention provides a method of manufacturing an electron emitting device including an amorphous electron supply layer, an insulating layer formed on the electron supply layer, and an electrode formed on the insulating layer, the electron emitting device emitting electrons when an electric field is applied between the electron supply layer and the electrode, the method including a step of forming a concave portion provided by notching the electrode and the insulating layer to expose the electron supply layer, and a step of forming a carbon layer covering the electrode and the concave portion except for an inner portion of an exposed surface of the electron supply layer and being in contact with an edge portion of the exposed surface of the electron supply layer.

BRIEF DESCRIPTION OF DRAWINGS

FIG. 13(*b*) is a graph showing the measurement results of the I-V characteristic of an electron emitting device in Comparative Example.

DETAILED DESCRIPTION OF THE INVENTION

An embodiment according to the present invention will hereinafter be described with reference to FIGS. 1 to 13. The present invention is not limited by the illustration in the following description.

Figure 1:
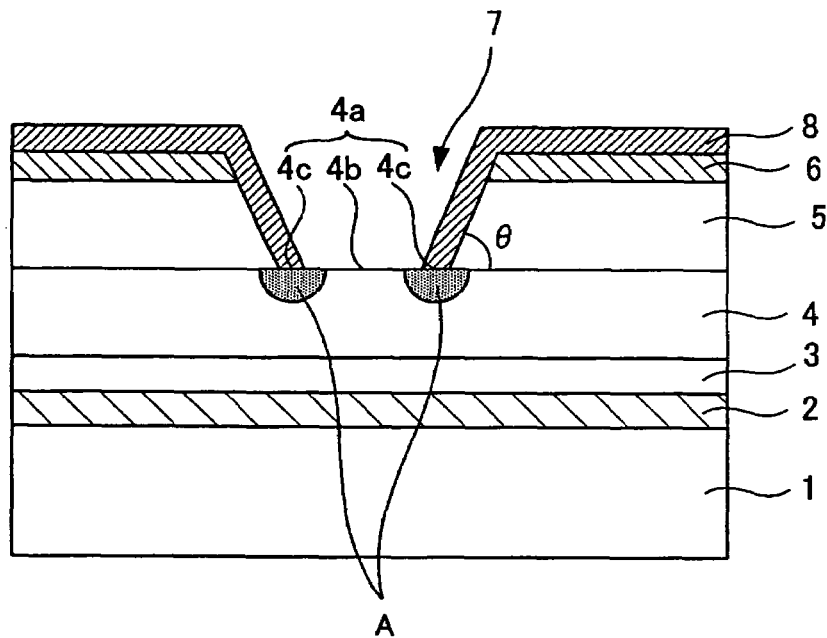
FIG. 1 is a schematic diagram showing a section view of an electron emitting device according to an embodiment of the present invention.

FIG. 1 is a section view schematically showing an electron emitting device according to an embodiment.

The electron emitting device shown in FIG. 1 has an MIS structure formed of metal, insulator, and semiconductor and includes a substrate 1 formed, for example, of a Si (silicon) substrate, a lower electrode 2 formed on the substrate 1 and made, for example, of Al (aluminum), a barrier layer 3 formed on the lower electrode 2 and made, for example, of TiN (titanium nitride), an amorphous electron supply layer 4 formed on the barrier layer 3 and made of semiconductor including Si doped with B (boron), an insulating layer 5 formed on the electron supply layer 4 and made, for example, of $SiO_x$ (x=0.1 to 2.0), and an upper electrode (electrode) 6 formed on the insulating layer 5 and made, for example, of W (tungsten). The barrier layer 3 is provided for preventing Al in the lower electrode 2 from diffusing into Si in the electron supply layer 4.

The electron emitting device has a concave portion 7 formed by notching the upper electrode 6 and the insulating layer 5 to the electron supply layer 4 such that the electron supply layer 4 is exposed at the bottom surface (a portion 4*a* in FIG. 1) of the concave portion 7. A carbon layer 8 is formed to cover the upper electrode 6 and the concave portion 7 except for an inner portion 4*b* of the exposed surface 4*a* of the electron supply layer 4 and is in contact with an edge portion 4*c* of the exposed surface 4*a*. A crystal phase A is provided in the region of the electron supply layer 4 that is in contact with the carbon layer 8.

Figure 2:
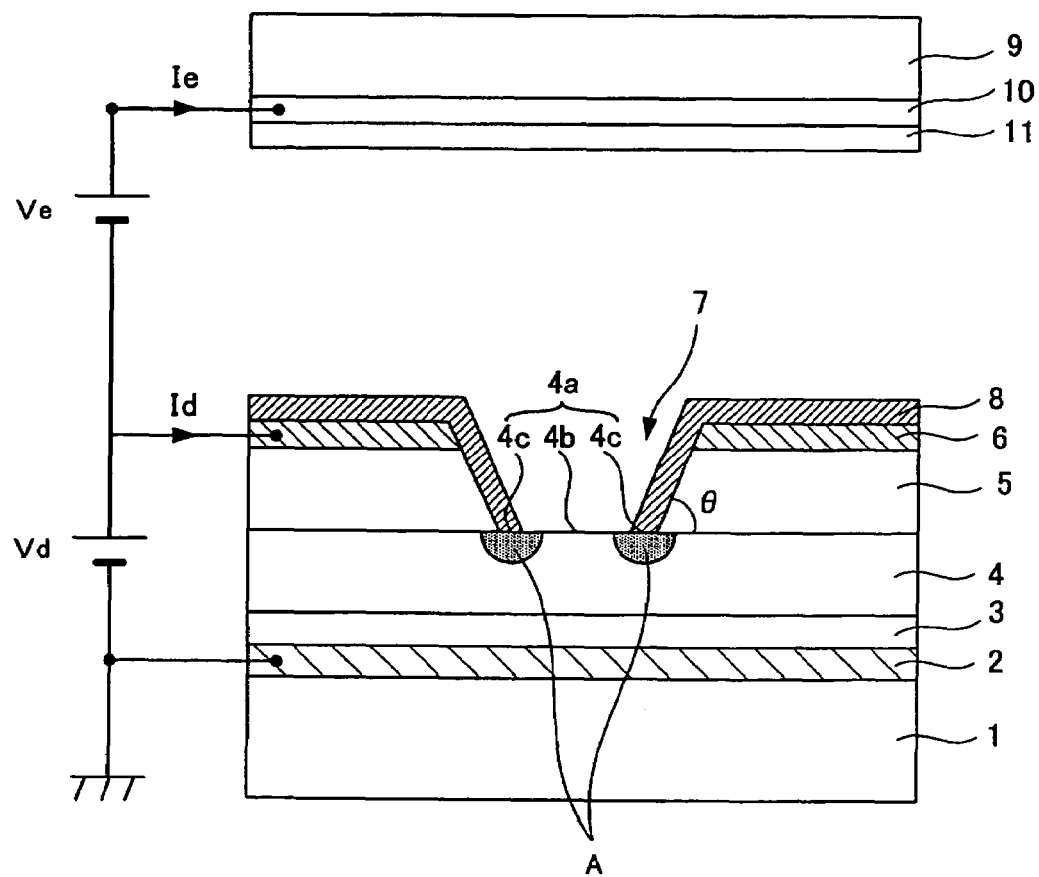
FIG. 2 is a schematic diagram for explaining the operation of the electron emitting device according to the embodiment of the present invention.

As shown in FIG. 2, a collector electrode 10 formed on a front substrate 9 is placed closer to the upper electrode 6 of the electron emitting device with a vacuum interposed between them. A voltage Vd is applied between the lower electrode 2 and the upper electrode 6 to cause electrons to be emitted from the upper electrode 6 and then to be collected by the collector electrode 10. A fluorescent layer 11 is formed as a light emitter on the collector electrode 10. The electrons are emitted from the electron emitting device toward the collector electrode 10 and are smashed against the fluorescent layer 11 to cause the fluorescent layer 11 to emit light.

The concave portion 7 is formed by notching the upper electrode and the insulating layer 5 to expose the electron supply layer 4 and has a conical shape with a gradually increasing diameter from the circular bottom surface to the top opening. The shape of the concave portion 7 is not limited thereto, and the bottom surface may be a circular shape, a square shape, or a linear shape, for example.

The side of the concave portion 7 may be provided such that an angle θ between the side wall of the insulating layer 5 and the surface of the electron supply layer 4 satisfies 0<θ<135°. The concave portion 7 can be formed when θ is larger than zero. If θ is equal to or larger than 135°, however, the side wall of the concave portion 7 interferes with the formation of the carbon layer 8 on the concave portion 7 to prevent the carbon layer 8 from extending to the side wall and the outer edge portion of the bottom surface of the concave portion 7, which may preclude the formation of the continuous carbon layer 8. Since the device has a miniature structure, the continuous carbon layer 8 can be formed with sputtering or the like as long as θ is equal to or smaller than 135°, and the resultant device can be driven properly.

The concave portion 7 is used as an emission site, and electrons are emitted concentratedly in this portion during energization. This can maintain the amount of emitted electrons, while the insulating layer 5 can have a large thickness except the concave portion 7 to prevent a defect such as a pinhole in the insulating layer 5.

The carbon layer 8 is formed on the upper electrode 6 and the concave portion 7 except for the inner portion 4*b* of the exposed surface 4*a* of the electron supply layer 4 such that the carbon layer 8 covers the upper electrode 6 and the inclined surface of the side wall of the concave portion 7 and is in contact with the edge portion 4*c* of the exposed surface 4*a* of the electron supply layer 4. In other words, the carbon layer 8 is in contact only with the edge portion 4*c* of the exposed surface 4*a* of the electron supply layer 4.

The portion of the exposed surface 4*a* of the electron supply layer 4 where the electron supply layer 4 is in contact with the carbon layer 8 has a width which is less than 30% of the diameter of the exposed surface 4*a* from the outer edge, more preferably a width less than 25%. In such a range, an electric current during energization can be locally concentrated and the amount of emitted electrons can be maintained sufficiently.

Since the carbon layer 8 is in contact with the edge portion 4*c* of the exposed surface 4*a* of the electron supply layer 4 and is not in contact with the inner portion 4*b*, the electric current during energization is concentrated on the edge portion 4*c* of the exposed surface 4*a* and the current flow to the inner portion 4*b* is suppressed to increase the efficiency of electron emission. Heat production in the carbon layer 8 due to the energization is also limited to the edge portion 4*c* of the exposed surface 4*a*, so that the heat amount can be reduced. Since the heat production in the carbon layer 8 is concentrated on the edge portion 4*c* of the exposed surface 4*a*, the edge portion 4*c* of the exposed surface 4*a* of the electron supply layer 4 is crystallized and the inner portion 4*b* is prevented from crystallization. As a result, the crystal phase A can be provided in a confined region to reduce a volume change of the electron supply layer 4 to prevent damage or breakage of the device.

Materials of the carbon layer 8 include carbon in the form of amorphous carbon, graphite, carbyne, fullerene ($C_{2n}$), diamond-like carbon, carbon nanotube, carbon nanofiber, carbon nanohorn, carbon nanocoil, carbon nanoplate, and diamond, or a carbon compound such as ZrC, SiC, WC, MoC, and HfC.

The carbon layer 8 preferably has a thickness of 0.1 to 100 nm, more preferably 0.1 to 60 nm. The carbon layer 8 having an extremely small thickness is difficult to provide uniformly, while the carbon layer having an extremely large thickness may increase a reactive current to reduce the efficiency of the device.

Figure 3:
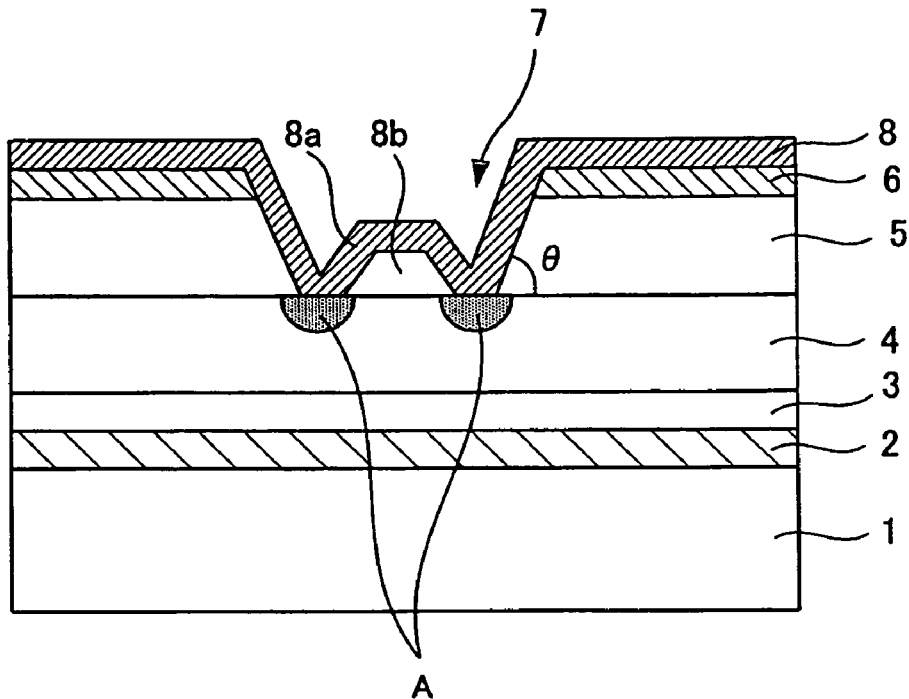
FIG. 3 is schematic diagram showing a section view of a modification of the electron emitting device according to the embodiment of the present invention.

FIG. 3 shows a modification of the carbon layer 8.

A carbon layer 8 in FIG. 3 is in contact with an edge portion 4c of an exposed surface 4a of an electron supply layer 4 and is raised to have a domical shape 8a in an inner portion 4b.

The carbon layer 8 having such a shape achieves similar effects to those in the device in FIG. 1 since the carbon layer 8 is not in contact with the inner portion 4b of the exposed surface 4a of the electron supply layer 4 and is in contact only with the edge portion 4c. Heat production in the carbon layer 8 during energization crystallizes only the edge portion 4c of the exposed surface 4a of the electron supply layer 4 and the inner portion 4b is prevented from crystallization.

Since the device is used in vacuum space, an interior 8b of the domical shape 8a of the carbon layer 8 is under vacuum. The vacuum insulation state in the interior 8b of the domical shape 8a favorably maintains insulation near the emission site to reduce a reactive current.

The crystal phase A is formed at the edge portion 4c of the exposed surface 4a of the electron supply layer 4 in the region where the electron supply layer 4 is in contact with the carbon layer 8. Preferably, the crystal phase A has a generally semicircular sectional shape in which the center of the semicircle corresponds to the point of the electron supply layer 4 in contact with the carbon layer 8, that is, the edge portion 4c of the electron supply layer 4, and the crystal phase A is formed in a ring shape along the circular edge portion 4c. While the radius of the semicircular section of the crystal phase A is not limited particularly, the crystal phase A in the ring shape can be provided by specifying the point of contact of the electron supply layer 4 with the carbon layer 8 as the center of the semicircle and by setting a radius not exceeding the midpoint of the exposed surface 4a. The shape of the crystal phase A is not limited to the semicircular section, and the crystal phase A may be formed over the entire region near the surface closer to the insulating layer 5 except for the inner portion 4b of the exposed surface 4a of the electron supply layer 4.

The particle diameter of the crystal phase A is not limited specifically but preferably ranges from 0.1 nm to the size corresponding to the region of the crystal phase A described above. A particle diameter smaller than 0.1 nm is beyond the resolution of a measurement apparatus, so that the adjustment of the particle diameter is difficult.

The crystal phase A formed at the edge portion 4c of the exposed surface 4a of the electron supply layer 4 allows an electric current to be concentrated on the crystal phase A during energization, so that the amount of emitted electrons can be increased at a low voltage. The crystal phase A is formed locally in the region of the edge portion 4c of the exposed surface 4a of the electron supply layer 4 and is prevented from being formed in the inner portion 4b, which can reduce a volume change in the electron supply layer 4 to preclude breakage of the device.

The generally semicircular sectional shape of the crystal phase A results from production of Joule heat by concentrating the electric current on the edge portion 4c of the exposed surface 4a of the electron supply layer 4 during energization. In other words, a reactive current is reduced during energization. The crystal phase A formed efficiently in this manner can reduce a volume change in the electrode supply layer 4 to prevent deformation or breakage of the device.

Figure 4:
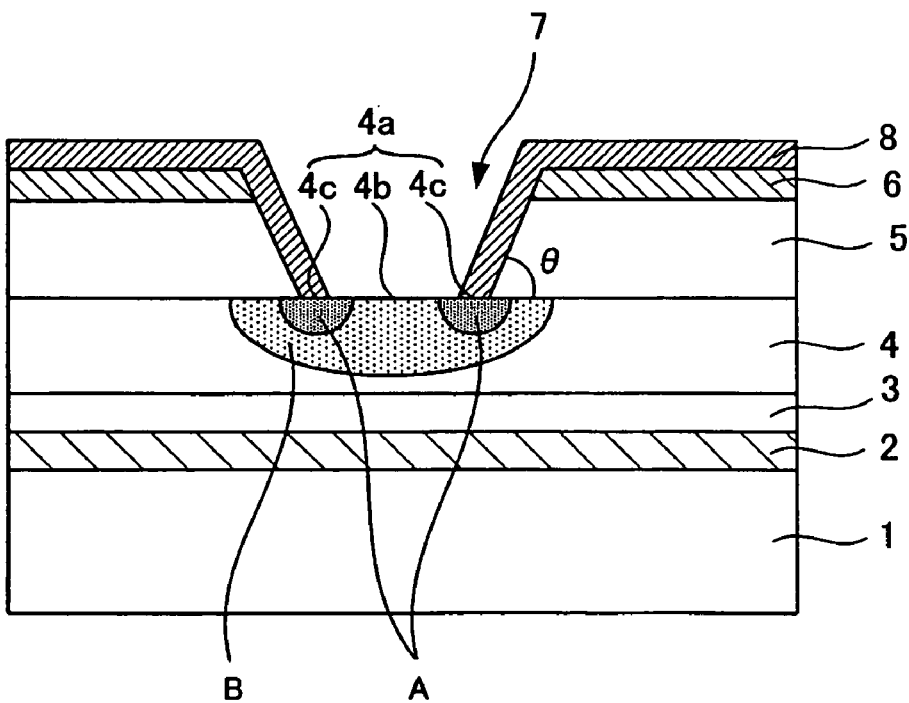
FIG. 4 is a schematic diagram showing a section view of a modification of the electron emitting device according to the embodiment of the present invention.

As shown in FIG. 4, it is possible to provide a crystal phase B having a crystal particle diameter smaller than that of the crystal phase A and formed around the crystal phase A. Since the crystal phase B is located away from the interface between the carbon layer 8 serving as a heat source and the electron supply layer 4, the crystal phase B is provided with a heat amount smaller than that in the crystal phase A and is formed to have the crystal particle diameter smaller than that of the crystal phase A. The amount of emitted electrons can be maintained when the crystal phase B is present around the crystal phase A in the electron supply layer 4 in this manner instead of the amorphous phase. In addition, since the crystal phase B has the small particle diameter, a volume change in the electron supply layer 4 can be reduced to prevent deformation or breakage of the device.

The crystal phase B having the generally semicircular sectional shape with the center thereof corresponding to the central portion of the exposed surface 4a of the electron supply layer 4 results from the efficient formation of the crystal phase B by concentrating an electric current on the portion of contact of the carbon layer 8 with the electron supply layer 4 during energization to produce Joule heat therein. This structure can reduce a volume change in the electron supply layer 4 to prevent deformation and breakage of the device. While FIG. 4 shows the horizontally semielliptical sectional shape since the crystal phase B is schematically shown, the crystal phase B may have a generally semicircular sectional shape having a circumference at a uniform distance from the center when the electron supply layer 4 is thickened in accordance with the size of the crystal phase B.

The crystal phase B may have any crystal particle diameter as long as it is smaller than that of the crystal phase A, and preferably, the diameter is as small as approximately 0.1 nm. The crystal particle diameter of the crystal phase B may be increased to a level which is slightly smaller than that of the crystal phase A. The crystal phase B does not show significant volume expansion and is stabilized due to the small crystal particles.

When a voltage is applied between the upper electrode 6 and the lower electrode 2 in the electron emitting device, an electric current passes from the upper electrode 6 to the electron supply layer 4 to cause electrons to diffuse in the electron supply layer 4 and to flow to the upper electrode 6. During energization, the electric current is concentrated on the edge portion 4c of the exposed surface 4a of the electron supply layer 4, that is, the portion of contact of the carbon layer 8 with the electron supply layer 4 to increase the current density. Thus, the electrons are concentrated on this position to increase the amount of emitted electrons.

The concentration of the electric current on the portion of contact of the carbon layer 8 with the electron supply layer 4 produces a large amount of Joule heat which produces the crystal phase A in the electron supply layer 4 along the edge portion 4c of the exposed surface 4a. The crystal phase A holds its form even when the temperature is reduced. Once the crystal phase A is formed, a current flow is promoted from the amorphous area to the crystal phase A when the current is concentrated on the portion of contact of the carbon layer 8 with the electron supply layer 4 during subsequent energization, so that the electric current can be more concentrated on that portion.

The abovementioned steps result in the device in which part of an injected current tunnels through the insulating layer 5 to emit electrons from the concave portion 7. Traps are present at various levels in the insulating layer 5. The electrons injected from the electron supply layer 4 by thermal excitation flow through $SiO_x$ in the insulating layer 5 with hopping conduction, and some of the electrons are captured by the traps closer to the electron supply layer 4. The captured electrons serve as fixed charge to produce significant band bending in the insulating layer 5 closer to the vacuum to cause a high electric field. The high electric field changes the electrons into hot electrons having high energy which are emitted into the vacuum.

According to the electron emitting device as described above, the confined portion of contact of the carbon layer with the electron supply layer allows the electric current to be concentrated on that contact portion to improve the efficiency of electron emission. In addition, the Joule heat in the carbon layer during energization is concentrated on the contact portion, so that the crystal phase in the electron supply layer is locally formed at the edge portion of the exposed surface to reduce a volume change due to crystallization to prevent damage to the device while the efficiency of electron emission is maintained.

Next, a method of manufacturing the electron emitting device according to the embodiment will be described.

The method of manufacturing the electron emitting device includes forming the lower electrode, the barrier layer, the electron supply layer, the insulating layer, and the upper electrode in order over the substrate, forming the concave portion by notching the insulating layer and the upper electrode, forming the carbon layer thereon, and stripping part of the carbon layer from the inner portion at the bottom surface of the concave portion. Alternatively, part of the carbon layer on the inner portion at the bottom surface of the concave portion is raised away from the electron supply layer into the domical shape.

In a modification, after the concave portion is formed, the carbon layer may be formed on the upper electrode and on the edge portion at the bottom surface of the concave portion with masking using a mask conforming to the inner portion at the bottom surface of the concave portion. Alternatively, after the electron supply layer is formed, the insulating layer and the upper electrode may be formed with masking to provide the concave portion.

The layer deposition may be performed by using a physical deposition method or a chemical deposition method. The physical deposition method is known as PVD (Physical Vapor Deposition) which includes vacuum deposition, molecular beam epitaxy, sputtering, ionization vapor deposition, and laser ablation. The chemical deposition method is known as CVD (Chemical Vapor Deposition) which includes thermal CVD, plasma CVD, and OMCVD (Organic-Metal Chemical Vapor Deposition). Among them, the sputtering of the physical deposition method is particularly preferable.

FIG. 5 to FIG. 12 show an example of the method of manufacturing the electron emitting device.

Figure 5:
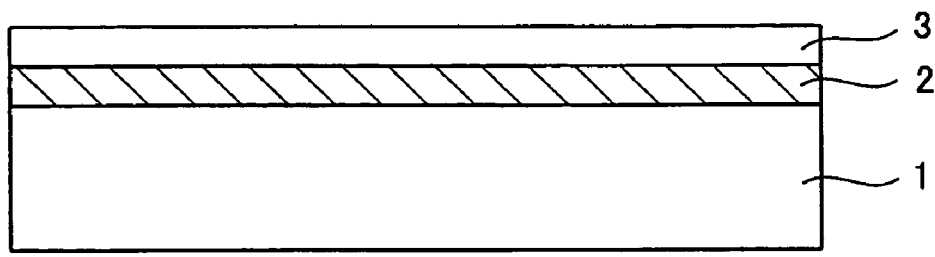
FIG. 5 is a schematic diagram for explaining a method of manufacturing the electron emitting device according to the embodiment of the present invention.
Figure 6:
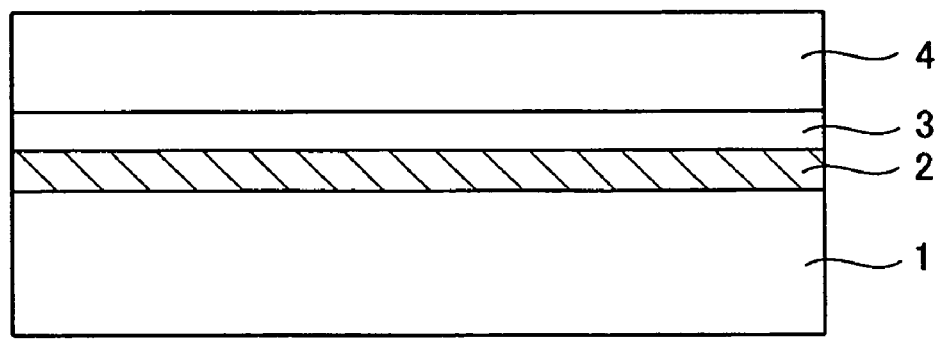
FIG. 6 is a schematic diagram for explaining the method of manufacturing the electron emitting device according to the embodiment of the present invention.
Figure 7:
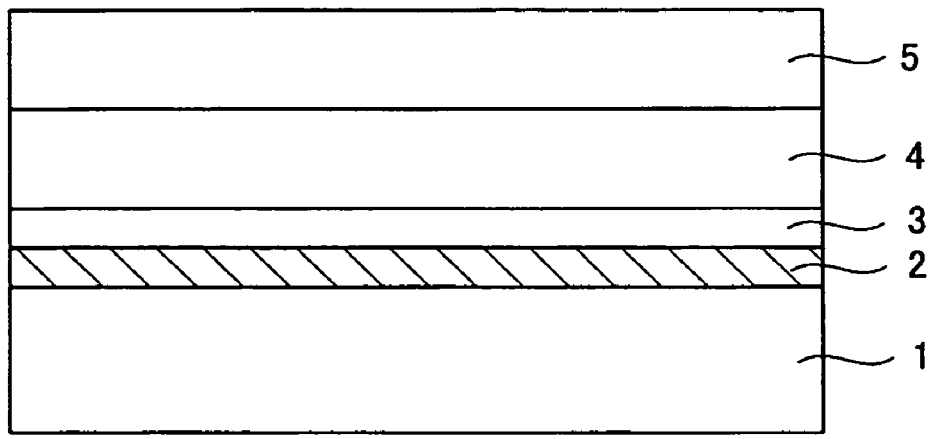
FIG. 7 is a schematic diagram for explaining the method of manufacturing the electron emitting device according to the embodiment of the present invention.
Figure 8:
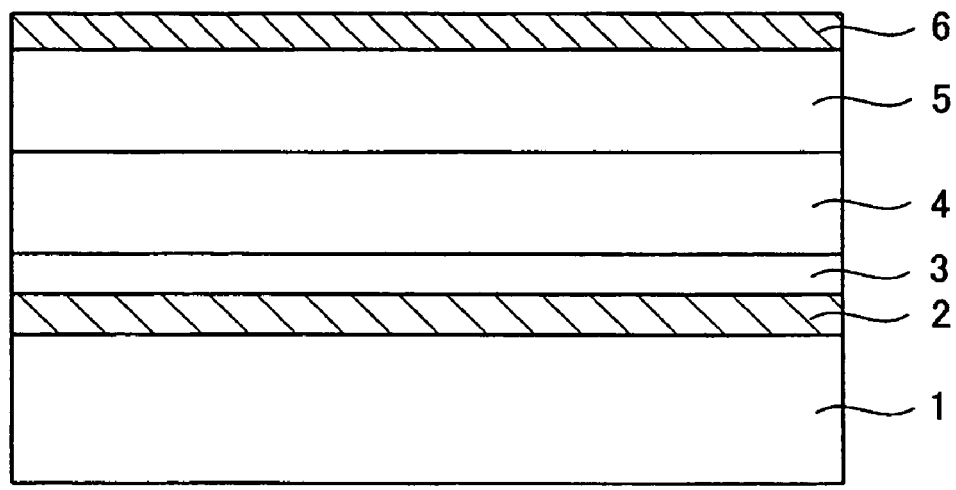
FIG. 8 is a schematic diagram for explaining the method of manufacturing the electron emitting device according to the embodiment of the present invention.

First, as shown in FIG. 5, the lower electrode 2 made of Al and the barrier layer 3 made of TiN are deposited with sputtering over the substrate 1 made of Si and having a thermal oxidation film formed thereon. Then, as shown in FIG. 6, the amorphous electron supply layer 4 including Si doped with B at a concentration of 1.1% is deposited on the barrier layer 3 with sputtering. As shown in FIG. 7, the insulating layer 5 made of $SiO_x$ is deposited on the electron supply layer 4 with plasma CVD using TEOS (Tetra ethoxysilane) as a material gas. The insulating layer 5 may be formed with sputtering instead. As shown in FIG. 8, the upper electrode 6 made of W is deposited on the insulating layer 5 with sputtering.

Figure 9:
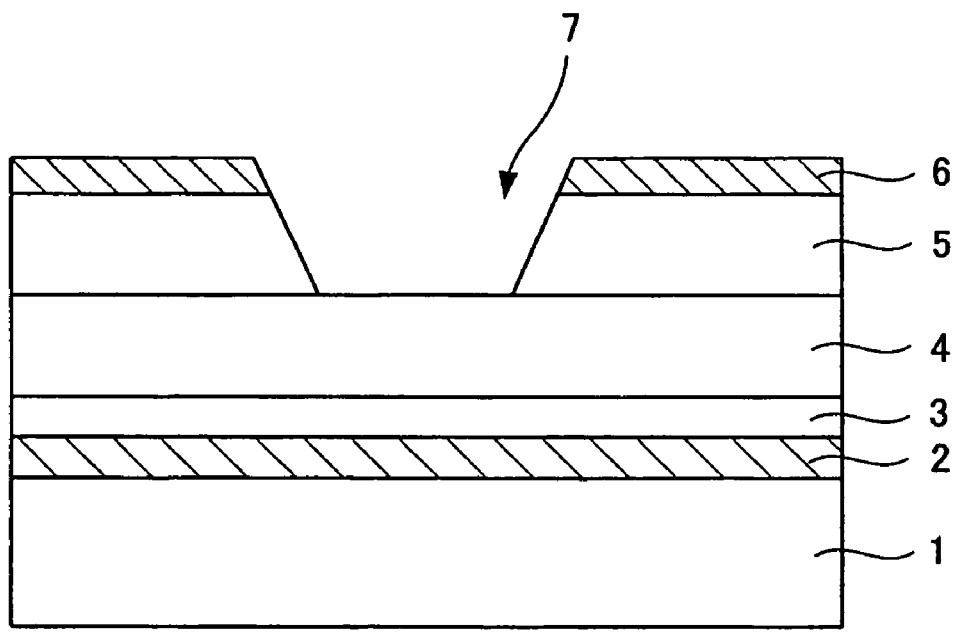
FIG. 9 is a schematic diagram for explaining the method of manufacturing the electron emitting device according to the embodiment of the present invention.
Figure 10:
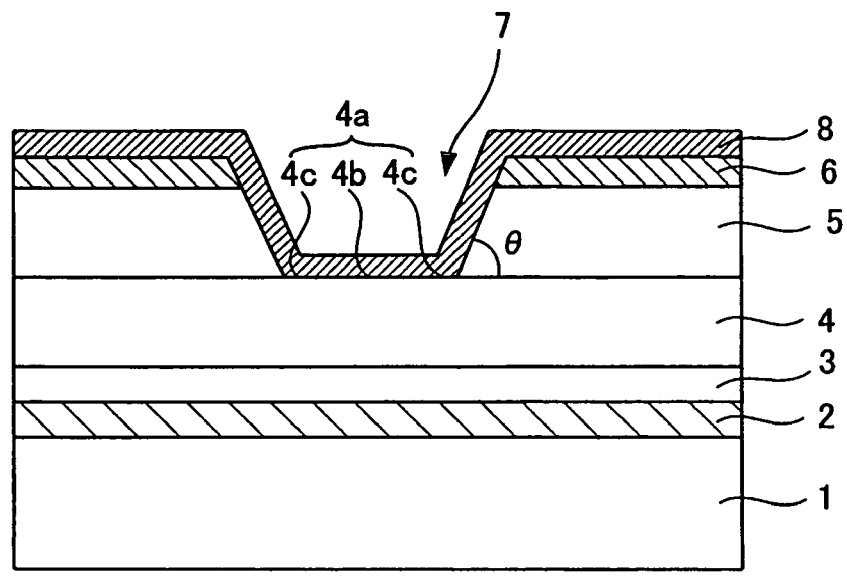
FIG. 10 is a schematic diagram for explaining the method of manufacturing the electron emitting device according to the embodiment of the present invention.

As shown in FIG. 9, the concave portion 7 is patterned by partially removing the upper electrode 6 and the insulating layer 5 to the electrode supply layer 4 through a photoetching process. After the concave portion 7 is formed, the carbon layer 8 is deposited with sputtering on the upper electrode 6 and the concave portion 7 as shown in FIG. 10.

Figure 11:
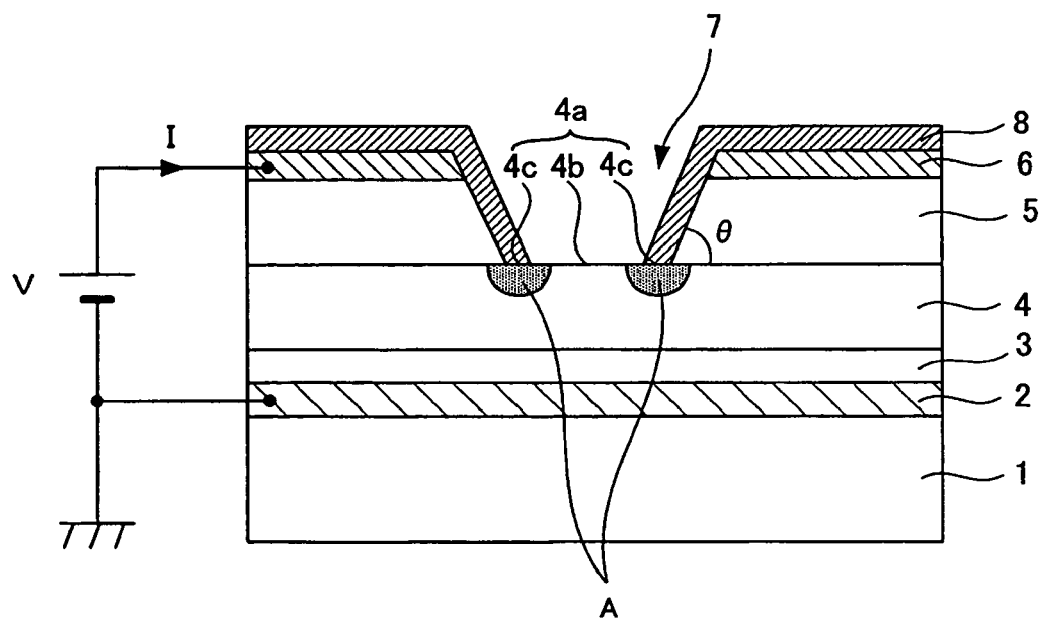
FIG. 11 is a schematic diagram for explaining the method of manufacturing the electron emitting device according to the embodiment of the present invention.

Next, as shown in FIG. 11, a voltage is applied between the upper electrode 6 and the lower electrode 2 and the energization produces Joule heat in the portion of the carbon layer 8 in contact with the electron supply layer 4. The Joule heat burns and strips the portion of the carbon layer 8 in the inner portion 4b of the exposed surface 4a of the electron supply layer 4. It is contemplated that the electric current passes while the carbon layer 8 is in contact with the exposed surface 4a and that the Joule heat is produced in the entire carbon layer 8 in contact with the exposed surface 4a, thereby burning and stripping the portion of the carbon layer 8 placed in the inner portion 4b of the exposed surface 4a.

Figure 12:
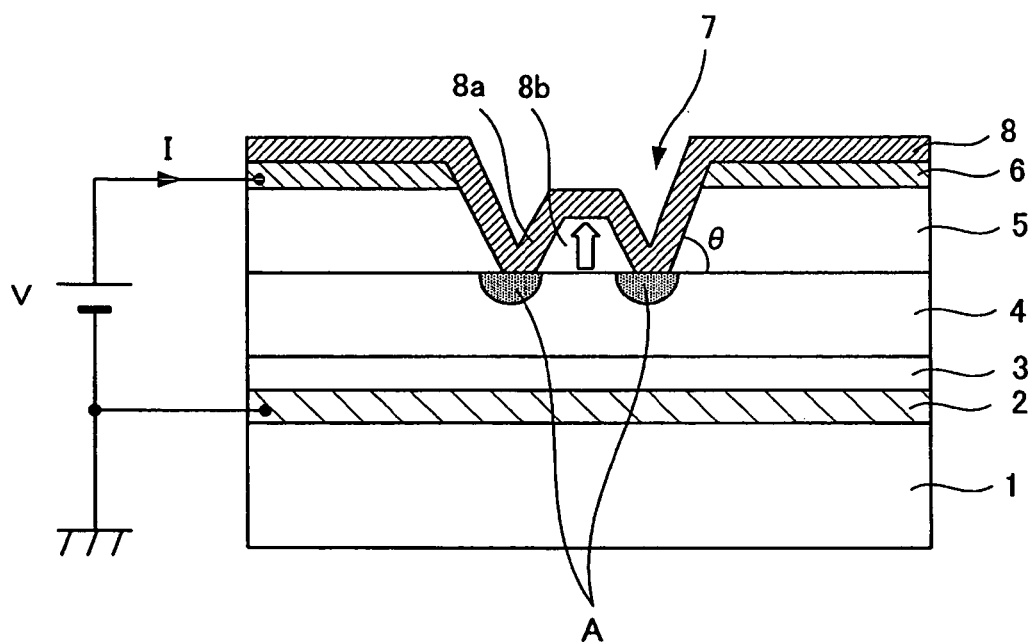
FIG. 12 is a schematic diagram for explaining a modification of the method of manufacturing the electron emitting device according to the embodiment of the present invention.

As shown in FIG. 12, when the Joule heat is controlled to be concentrated on the edge portion 4c of the exposed surface 4a, the portion of the carbon layer 8 in the inner portion 4b of the exposed surface 4a of the electron supply layer 4 is raised due to thermal expansion to have the domical shape 8a. The domical shape 8a shown in FIG. 12 can be provided, for example by forming a recess in the edge portion 4c of the exposed surface 4a such that the electric current tends to be concentrated in that recess. When no recess is formed in the outer edger portion of the concave portion 7, the stripped state as shown in FIG. 11 can be provided. The stripped state or the domical shape of the carbon layer 8 can also be controlled by locally changing the degree of doping in the electron supply layer.

When the carbon layer 8 is raised to have the domical shape 8a in this manner, the portion of the carbon layer 8 separated from the inner portion 4b of the exposed surface 4a of the electron supply layer 4 serves as the domical shape 8a and is fixed on the device to eliminate the need to remove the separated carbon layer 8 with cleaning or the like.

After the concave portion 7 is formed and before the carbon layer 8 is formed in FIG. 9, pretreatment can be performed with plasma processing such as RF plasma etching, cleaning, or heat treatment such as baking. Then, the carbon layer 8 is formed, and when the portion of the carbon layer 8 is stripped from the inner portion 4b of the exposed surface 4a of the electron supply layer 4, the stripping of the carbon layer 8 can be promoted by the pretreatment. Examples of the cleaning include heating $H_2SO_4$ cleaning, dilute HF solution cleaning, pure water cleaning, acetone cleaning, and alcohol cleaning. The pretreatment may damage the previously deposited layers, especially the outermost layer, but the pretreatment can be performed under controlled conditions in view of the possible damage.

Simultaneously with the stripping or raising of the carbon layer, the Joule heat in the carbon layer 8 produced during the energization is transferred to the edge portion 4c of the exposed surface 4a of the electron supply layer 4 to heat and crystallize the region of the electron supply layer 4 that includes the edge portion 4c at the center, thereby forming the crystal phase A. The voltage in this case is applied with sweep to be gradually increased from low to high levels until the diode current is reduced or an inflection point is found in the diode current and an emission current flows.

To provide the generally semicircular section of the crystal phase A with the center thereof corresponding to the point of contact with the carbon layer 8, the Joule heat is concentrated on the portion of contact of the electron supply layer 4 with the carbon layer 8, that is, the edge portion 4c of the exposed surface 4a of the electron supply layer 4, and the heat is transferred radially from the edge portion 4c.

Specifically, the size of the crystal phase A can be adjusted by controlling the amount of heat produced at the edge portion 4c of the exposed surface 4 of the electron supply layer 4. The heat amount can be controlled by the applied voltage and the sweep rate of voltage. A plurality of concave portions 7 are typically provided over the substrate 1 to constitute the device, and the heat amount can be controlled by the number (density) of the concave portions 7 and the arrangement thereof.

The size of the crystal phase A can also be adjusted by controlling the sweep rate of voltage during energization. As the sweep rate is lower, the heat is transferred to a region outside the concave portion 7 to increase easily the temperature of the concave portion 7 to allow crystallization of the electron supply layer 4 at a lower voltage. As the sweep rate is too high, a large electric current may break the device. For those reasons, the sweep rate can be set in a range from 0.001 to 5 V/sec to prevent extreme Joule heat production to adjust the size of the crystal phase A. A higher sweep rate than those in the range may be used, and in such a case, the applied voltage preferably has a pulse shape with a specific width.

The region of the crystal phase A in the electron supply layer 4 can be controlled to prevent breakage of the device by controlling the current amount passing through the device during energization, that is, by imposing a limit on the electric current. This can also control the deformation amount of the carbon layer 8 in the stripping or raising thereof. For example, a driving circuit such as a transistor can be used to set the current limit.

The shape and size of the crystal phase A can also be controlled by adjusting the angle (θ) of the concave portion 7 and the thickness of the insulating layer 5.

To provide the crystal phase B having the crystal particle diameter smaller than that of the crystal phase A around the crystal phase A, the amount of heat at the edge portion 4c of the exposed surface 4a of the electron supply layer 4 may be adjusted similarly to the formation of the crystal phase A. To form the generally semicircular section of the crystal phase B with the center thereof corresponding to the midpoint of the exposed surface 4a of the electron supply layer 4, adjustment is performed similarly to the formation of the crystal phase A.

In the method of manufacturing the electron emitting device, the steps from the stripping of the carbon layer 8 to the formation of the crystal phase A are described on the basis of a mechanism generally called self-control.

Through the self-control, the Joule heat produced by the energization spontaneously raises the carbon layer 8 to reduce the area of contact of the carbon layer 8 with the electron supply layer 4 to avoid extreme part of the Joule heat. It is thought that the stripping of the carbon layer 8 shown in FIG. 11 occurs when the extreme Joule heat production cannot be avoided by the self-control, and the Joule heat burns the portion of the carbon layer 8 inside the concave portion 7. The raising of the carbon layer 8 shown in FIG. 12 occurs when the extreme heat is avoided by the self-control. In this case, the portion of the carbon layer 8 inside the concave portion 7 is formed into the domical shape 8a to produce the hollow region 8b. As a result of the self-control, the electric current is concentrated on the portion of contact of the carbon layer 8 with the electron supply layer 4 to crystallize the electron supply layer 4 immediately below to form the crystal phase A.

The self-control can significantly reduce breakage of the device to manufacture the electron emitting device more stably.

To strip the carbon layer 8 from the inner portion 4b of the exposed surface 4a of the electron supply layer 4, the control of the adhesion strength of the carbon layer 8 and the inner portion 4b is important.

The pretreatment such as etching, cleaning, or heat treatment can be performed on the surface of the layers before the formation of the carbon layer 8 as described above to control the adhesion strength of the carbon layer 8. The adhesion strength of the carbon layer 8 and the electron supply layer 4 can also be adjusted by controlling the deposition conditions of the carbon layer 8 or by changing the material of the carbon layer 8. In addition, the adhesion strength of the carbon layer 8 can be controlled from the structural aspects by changing the area of contact or the shapes of the carbon layer 8 and the upper electrode 6 or the electron supply layer 4. For example, the bottom surface of the concave portion 7 can be formed in a multistage structure or a dimple structure to control the adhesion strength. Also, the concave portion 7 can be formed in a circular shape, an elliptical shape, an oval shape, a polygonal shape, or a closed curve shape to control the adhesion strength.

The control of the adhesion strength of the carbon layer 8 can prevent stripping or raising of the portion of the carbon layer 8 other than the portion thereof located in the concave portion 7 and can realize the stripping or raising of the portion of the carbon layer 8 only in the inner portion at the bottom surface of the concave portion 7.

The crystal phase A in the electron supply layer 4 preferably has a small area in order to prevent breakage of the electron emitting device.

As described above, the area of contact of the carbon layer 8 with the electron supply layer 4 can be limited to confine the region where the crystal phase A is formed to near the contact portion. In such a structure, even when the injected current is reduced, the current is concentrated on the contact portion due to the small contact area to provide a large amount of Joule heat. Specifically, the structure in which the small area of the carbon layer 8 is in contact with the electron supply layer 4 enables prevention of crystallization of the whole electron supply layer 4 with the use of the reduced injected current and allows concentration of the current on the contact area to provide a large amount of Joule heat to form the crystal phase A locally.

Since the crystal phase A in the electron supply layer 4 can be confined to the small area, the structure is advantageous in providing miniature electron emitting devices. The confined region of crystallization leads to manufacture of an device which operates at a low current. In other words, the power consumption can be reduced. In addition, since the electron emitting device typically emits electrons into vacuum-sealed space, the prevention of the breakage of the device reduces gas emission to increase the life of the apparatus as a whole.

A particularly effective material of the electron supply layer is amorphous silicone (a-Si) doped with a group IIIb or group Vb element and deposited with the abovementioned sputtering or CVD. It is also possible to use hydrogenated amorphous silicone in which a-Si dangling bond is terminated by hydrogen, hydrogenated amorphous silicon carbide in which carbon substitutes for part of Si, hydrogenated amorphous silicon nitride in which nitrogen substitutes for part of Si, an elemental semiconductor and a compound semiconductor of a IV, a III-V, or a II-VI group such as germanium, Ge—Si, silicon carbide, gallium arsenide, indium phosphide, cadmium selenide, and CuInTe2 instead of Si, or silicon doped with boron, gallium, phosphorous, indium, arsenic, or antimony. Alternatively, metal such as Al, Au, Ag, and Cu can be effectively used, and it is possible to use Sc, Ti, Cr, Mn, Fe, Co, Ni, Zn, Ga, Y, Zr, Nb, Mo, Tc, Ru, Rh, Pd, Cd, Ln, Sn, Ta, W, Re, Os, Ir, Pt, Tl, Pb, La, Ce, Pr, Nd, Pm, Sm, Eu, Gd, Tb, Dy, Ho, Er, Tm, Yb, and Lu.

The electron supply layer preferably has a thickness of 0.1 nm to 10 μm. A thickness less than 0.1 nm may result in difficulty in forming a uniform layer to prevent proper formation of the crystal phase A, while a thickness larger than 10 μm is disadvantageous in that a long deposition time is required.

For the electron supply layer made of Si and B, the doping concentration of B preferably ranges from 0.1 to 20.0%. Although a lower doping concentration of B can reduce a defective hollow to prevent the breakage of the device, an extremely low doping concentration of B leads to a high resistance value to need application of a high voltage.

For the material of the insulating layer, $SiO_x$ (x represents an atomic ratio) described above is particularly effective, and it is also possible to use a metal oxide or a metal nitride including $LiO_x$, $LiN_x$, $NaO_x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $ZrO_x$, $ZrN_x$, $HfO_x$, $HfN_x$, $ThO_x$, $VO_x$, $VN_x$, $NbO_x$, $NbN_x$, $TaO_x$, $TaN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $SiN_x$, $GeO_x$, $SnO_x$, $PbO_x$, $PO_x$, $PN_x$, $ASO_x$, $SbO_x$, $SeO_x$, and $TeO_x$.

It is also possible to use a metal composite oxide such as $LiAlO_2$, $Li_2SiO_3$, $Li_2TiO_3$, $Na_2Al_{22}O_{34}$, $NaFeO_2$, $Na_4SiO_4$, $K_2SiO_3$, $K_2TiO_3$, $K_2WO_4$, $Rb_2CrO_4$, $CS_2CrO_4$, $MgAl_2O_4$, $MgFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GeFeO_3$, $Gd_3Fe_5O_{12}$, $DyFeO_3$, $Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCuO_4$, $K_2MoO_4$, $Na_2MoO_4$, $NiMoO_2$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $COMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_5$, $FeTiOO_3$, $MgTiO_3$, $Na_2SiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2$—$Sb_2O_3$, $CuSeO_4$, $Na_2SeO_3$, $ZnSeO_3$, $K_2TeO_3$, $K_2TeO_4$, $Na_2TeO_3$, and $Na_2TeO_4$. Other effective materials for the insulating layer include a sulfide such as FeS, $Al_2S_3$, MgS, and ZnS, a fluoride such as LiF, $MgF_2$, and $SmF_3$, a chloride such as HgCl, $FeCl_2$, and $CrCl_3$, a bromide such as AgBr, CuBr, and $MnBr_2$, an iodide such as $PbI_2$, CuI, and $FeI_2$, a lanthanoid boride compound such as $LaB_6$ and $CeB_6$, a metal boride such as $TiB_2$, $ZrB_2$, and $HfB_2$, or a metallic oxynitride such as SiAlON.

Other effective materials for the insulating layer include carbon such as diamond and fullerene ($C_{2n}$) or a metal carbide such as $Al_4C_3$, $B_4C$, $CaC_2$, $Cr_3C_2$, $Mo_2C$, MoC, NbC, SiC, TaC, TiC, VC, $W_2C$, WC, and ZrC. Fullerene ($C_{2n}$) is a spherical mesh molecule made only of carbon atoms and typified by $C_{60}$, and includes $C_{32}$ to $C_{960}$. In the above chemical formulas, x in $O_x$ or $N_x$ represents an atomic ratio.

The insulating layer has a thickness of 50 nm or larger, more preferably approximately 100 nm to 1 μm, except the concave portion. In the embodiment, since the concave portion serves as the emission site, the amount of emitted electrons can be increased even when the insulating layer has a large thickness except the concave portion. Since the large thickness of the insulating layer reduces a leak current, the current is not wasted and can be used for producing the required Joule heat accordingly. If the insulating layer has an extremely large thickness, step coverage is poor in the subsequent layers and the amount of emitted electrons may be reduced. The plasma CVD using TEOS can reduce defects which may cause a leak current and can form the insulating layer having a thickness of 50 nm. The sputtering can form the insulating layer having a thickness of 100 nm to 1 μm to prevent defects favorably.

For the material of the lower electrode 2, it is possible to use a material generally used for IC wiring such as Au, Pt, and W, a three-layer structure including chromium, nickel, and chromium, an alloy of Al an Nd, an alloy of Al and Mo, and an alloy of Ti and N, in addition to Al described above.

For the material of the upper electrode 6, it is possible to use effectively metal such as Pt, Au, Ru, and Ir in addition to W described above. It is also possible to use Be, C, Al, Si, Sc, Ti, V, Br, Mn, Fe, Co, Ni, Cu, Zn, Ga, Y, Zr, Nb, Mo, Tc, Rh, Pd, Ag, Cd, In, Sn, Ta, Re, So, Tl, Pb, La, Ce, Pr, Nd, Pm, Sm, Eu, Gd, Tb, Dy, Ho, Er, Tm, Yb, and Lu.

EXAMPLE

Next, Example of the present invention will be described.

In Example, a lower electrode 2 made of Al and a barrier layer 3 made of TiN were deposited with sputtering to have thicknesses of 600 nm and 150 nm, respectively, over a substrate 1 made of Si and having a thermal oxidation film formed thereon. An electron supply layer 4 made of amorphous Si doped with B at a concentration of 1.1% was deposited thereon with sputtering to have a thickness of 8.4 μm. An insulating layer 5 made of $SiO_x$ was deposited thereon with plasma CVD using TEOS to have a thickness of 300 nm. An upper electrode 6 made of W was deposited thereon with sputtering to have a thickness of 60 nm. The upper electrode and the insulating layer 5 were partially removed to the electron supply layer 4 through a photoetching process to form a concave portion 7 having a depth of 360 nm. The concave portion 7 was formed such that an angle θ between the side of the insulating layer 5 and the electron supply layer 4 ranged from 70 to 100°. Sixteen concave portions 7 were formed in a 4-by-4 matrix with a 10-μm pitch over the substrate 1. Next, baking was performed at 350° C. for two hours in a vacuum as pretreatment before the formation of a carbon layer 8. Then, the carbon layer 8 was deposited with sputtering to have a thickness of 60 nm on the upper electrode 6 and the concave portion 7.

In Comparative Example, an device was formed through the same steps as those in Example described above except that baking was not performed as pretreatment before formation of carbon.

Next, the devices of Example and Comparative Example described above were placed in a vacuum and a collector electrode 10 was placed above the upper electrode 6. The upper electrode 6 was located 2 mm from the collector electrode 10. While a voltage of 1 kV was applied between the upper electrode 6 and the collector electrode 10, a voltage up to 20 V was applied between the lower electrode 2 and the upper electrode 6 at a sweep rate of 0.33 V/s. The sectional shape after the energization was observed with a TEM, while the surface shape was observed with an SEM. I-V characteristics per site were measured and the results thereof are shown in FIGS. 13(a) and 13(b). FIG. 13(a) shows the device in Example, while FIG. 13(b) shows the device in Comparative Example. The conditions in the voltage application including the sweep rate in the above energization provide illustrative ones and the present invention is not limited thereto.

The results of the TEM observation have shown that the carbon layer 8 in Example was in contact with an edge portion 4c of an exposed surface 4a of the electron supply layer 4 and was raised in an inner portion 4b to have a domical shape 8a. It is thought that this is because the pretreatment with heat treatment before the formation of the carbon layer 8 caused the self-control during the energization to raise the carbon layer 8. It has been found out that a crystal phase A was provided in a portion of the electron supply layer 4 with the center thereof corresponding to the point of the carbon layer 8 in contact with the edge portion 4c of the exposed surface 4a of the electron supply layer 4. The crystal phase A had a generally semicircular section and had a depth of 0.4 μm from the upper surface of the electron supply layer 4. It is thought that this is because the carbon layer 8 is in contact only with the edge portion 4c of the exposed surface 4a of the electron supply layer 4, so that Joule heat produced during the energization is concentrated on the edge portion 4c to prevent crystallization of the inner portion 4b.

In contrast, the carbon layer in Comparative Example was in contact with the entirety of the exposed surface of the electron supply layer. A crystal phase in the electron supply layer extended as deep as 5.0 μm from the upper surface of the electron supply layer to show the crystallization in a wider region than in Example. It is thought that this is because pretreatment was not performed before the carbon layer was formed, so that the self-control did not function and the area of the electron supply layer in contact with the carbon layer was increased, thereby subjecting the electron supply layer to extreme Joule heat from the carbon layer during energization to widen the crystal phase in the electron supply layer.

The results of the SEM observation have shown that no damage was observed in the surface of the device in Example and that expansion was observed at the edge portion of the circular concave portion and in the surrounding region thereof and some of the surface shape was damaged in Comparative Example. It is thought that this is because the carbon layer was in contact with the entirety of the bottom surface in the concave portion in Comparative Example, so that the Joule heat production was increased to crystallize the wide range of the electron supply layer to cause the expansion thereof.

Figure 13:
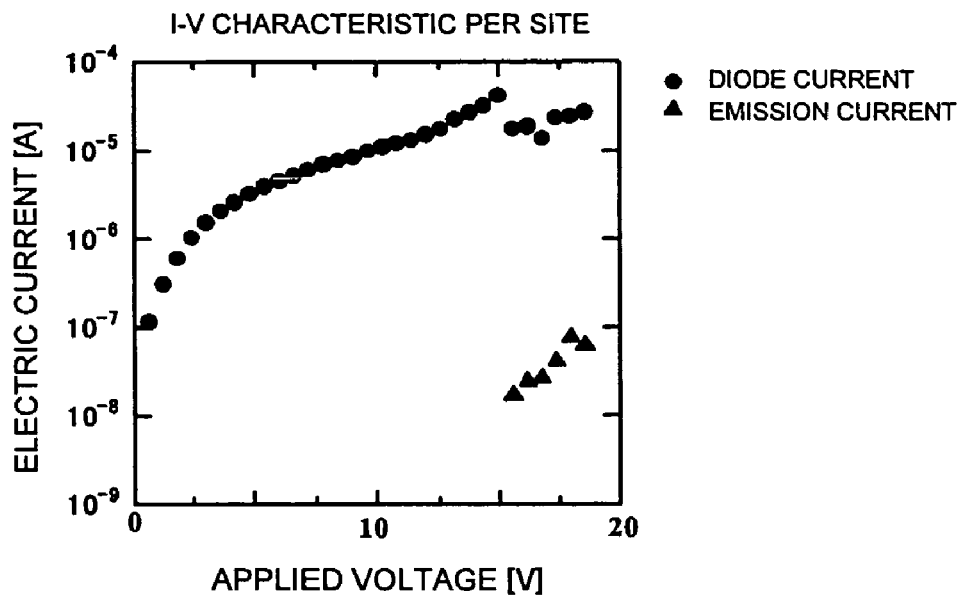
FIG. 13(*a*) is a graph showing the measurement results of the I-V characteristic of the electron emitting device in Example according to the present invention.
Figure 13:
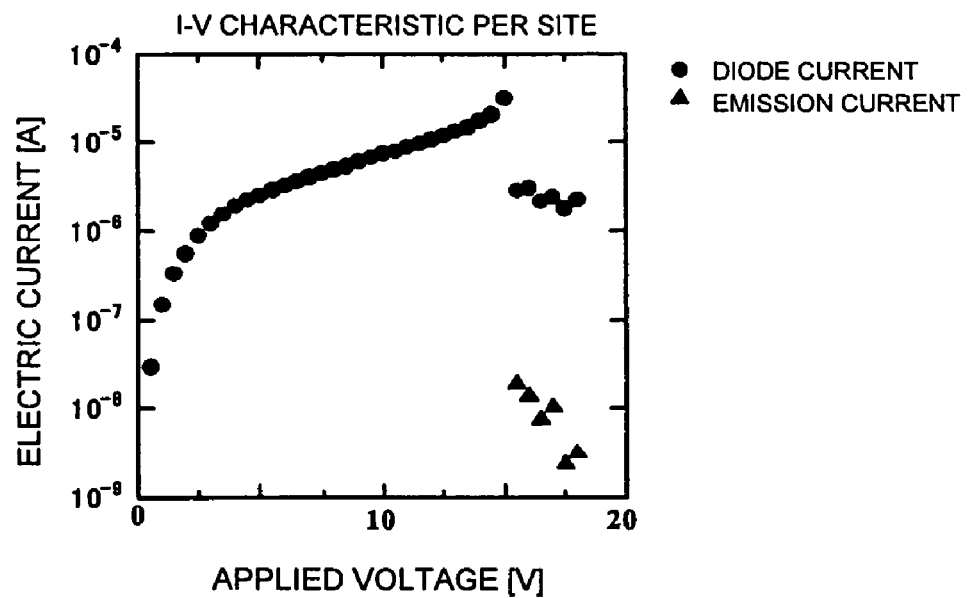

As shown in FIG. 13(*a*), in the I-V characteristic in Example, a diode current is reduced near an applied voltage of 15V and an emission current is produced. It is thought that this is because electrons are emitted in the concave portion 7 as the emission site when an applied voltage between the lower electrode 2 and the upper electrode 6 exceeds a particular value.

In Comparative Example shown in FIG. 13(*b*), a diode current is reduced near an applied voltage of 15V and an emission current is produced. As the voltage value is increased, the emission current is reduced and has a smaller value than in Example shown in FIG. 13(*a*).

In this manner, in Example, it is thought that the self-control functioned as seen from the abovementioned TEM observation and SEM observation, so that the carbon layer 8 was raised from the inner portion 4b of the exposed surface 4a of the electron supply layer 4 to concentrate the electric current on the edge portion 4c of the exposed surface 4a during the energization to achieve the electron emission efficiently.

As described above, the electron emitting device according to the present invention includes an amorphous electron supply layer, an insulating layer formed on the electron supply layer, and an electrode formed on the insulating layer, the electron emitting device emitting electrons when an electric field is applied between the electron supply layer and the electrode, wherein the electron emitting device includes a concave portion provided by notching the electrode and the insulating layer to expose the electron supply layer, and a carbon layer covering the electrode and the concave portion except for an inner portion of an exposed surface of the electron supply layer and being in contact with an edge portion of the exposed surface of the electron supply layer, thereby improving the efficiency of electron emission and preventing damage to the device.

A display apparatus using the electron emitting device according to the present invention includes an electron emitting device and a light emitter which emits light when electrons emitted from the electron emitting device are smashed against the light emitter, wherein the electron emitting device is the abovementioned electron emitting device, thereby improving the efficiency of electron emission and preventing damage to the device. It is thus possible to provide a display apparatus which achieves energy savings and long life.

The method of manufacturing the electron emitting device according to the present invention includes an amorphous electron supply layer, an insulating layer formed on the electron supply layer, and an electrode formed on the insulating layer, the electron emitting device emitting electrons when an electric field is applied between the electron supply layer and the electrode, the method including a step of forming a concave portion provided by notching the electrode and the insulating layer to expose the electron supply layer, and a step of forming a carbon layer covering the electrode and the concave portion except for an inner portion of an exposed surface of the electron supply layer and being in contact with an edge portion of the exposed surface of the electron supply layer, thereby improving the efficiency of electron emission and preventing damage to the device.

While the present invention has been described with reference to the specific embodiments, it is apparent to those skilled in the art that various modifications can be made without departing from the scope of the present invention. Thus, the technical scope of the present invention is not limited to the embodiment described above but should be defined on the basis of the claims and the equivalent thereof.

The invention claimed is:

1. An electron emitting device comprising:
   an amorphous electron supply layer;
   an insulating layer disposed on said electron supply layer; and
   an electrode disposed on said insulating layer,
   wherein a concave portion is configured to expose a surface of said electron supply layer, and a carbon layer covers said electrode and said concave portion, except for an inner portion of said exposed surface of said electron supply layer, said carbon layer being in direct contact with an edge portion of said exposed surface of said electron supply layer.

2. The electron emitting device according to claim 1, wherein said carbon layer has a domical shaped portion on said inner portion of said exposed surface of said electron supply layer.

3. The electron emitting device according to claim 2, wherein said domical shaped portion has a vacuum interior.

4. The electron emitting device according to claim 1, wherein said electron supply layer includes a first crystal phase which is in contact with said carbon layer.

5. The electron emitting device according to claim 4, wherein said first crystal phase has a generally semicircular sectional shape.

6. The electron emitting device according to claim 4, wherein said electron supply layer includes a second crystal phase around said first crystal phase, said second crystal phase including crystal particles having a smaller diameter than that of said first crystal phase.

7. The electron emitting device according to claim 6, wherein said second crystal phase has a generally semicircular sectional shape.

8. A display apparatus comprising:
an electron emitting device and a light emitter which emits light when electrons emitted from an electron emitting device are smashed against said light emitter, wherein said electron emitting device is the electron emitting device according to claim 1.

9. A method of manufacturing an electron emitting device comprising an amorphous electron supply layer, an insulating layer disposed on the electron supply layer, and an electrode disposed on the insulating layer, the electron emitting device emitting electrons when an electric field is applied between the electron supply layer and the electrode, said method comprising:
forming a concave portion by notching the electrode and the insulating layer to expose the electron supply layer, and
forming a carbon layer covering the electrode and the concave portion, except for an inner portion of an exposed surface of the electron supply layer, such that the carbon layer is in direct contact with an edge portion of the exposed surface of the electron supply layer.

10. The method of manufacturing an electron emitting device according to claim 9, wherein said forming a carbon layer includes forming the carbon layer on the electrode and the concave portion, passing an electric current between the electron supply layer and the electrode, and stripping the carbon layer from the inner portion of the exposed surface of the electron supply layer by Joule heat produced from the carbon layer.

11. The method of manufacturing an electron emitting device according to claim 9, wherein said forming a carbon layer includes forming the carbon layer on the electrode and the concave portion, passing an electric current between the electron supply layer and the electrode, and raising the carbon layer on the inner portion of the exposed surface of the electron supply layer into a domical shape by Joule heat produced from the carbon layer.

12. The method of manufacturing an electron emitting device according to claim 9, further comprising performing at least one of etching treatment, cleaning treatment, and heat treatment on the exposed surface of the electron supply layer before the carbon layer is formed.

13. The method of manufacturing an electron emitting device according to claim 9, further comprising passing an electric current between the electron supply layer and the electrode and crystallizing a region of the electron supply layer in contact with the carbon layer by Joule heat produced from the carbon layer.

* * * * *